Sept. 6, 1938.    A. O. FUHRMANN    2,129,268
MOLD FOR PLASTIC MATERIALS AND METHOD OF MAKING THE SAME
Filed May 15, 1936
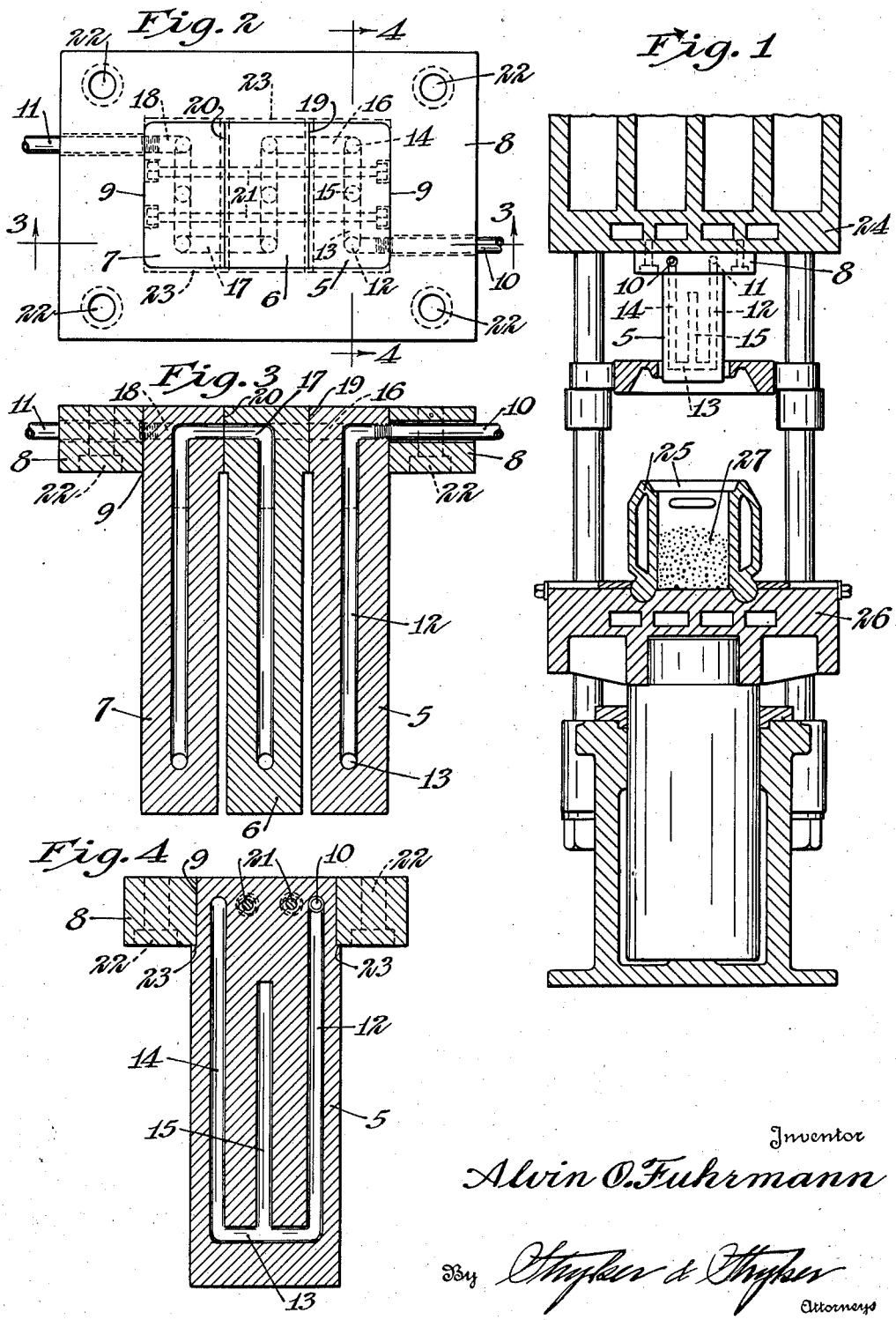
Inventor
Alvin O. Fuhrmann
By Stryker & Stryker
Attorneys Patented Sept. 6, 1938

2,129,268

UNITED STATES PATENT OFFICE 2,129,268

MOLD FOR PLASTIC MATERIALS AND METHOD OF MAKING THE SAME

Alvin O. Fuhrmann, Rock Island, Ill., assignor to National Battery Company, St. Paul, Minn., a corporation of Delaware Application May 15, 1936, Serial No. 79,874

6 Claims. (Cl. 29—148.2)

This invention relates to a mold for use in the manufacture of electrical storage battery containers and like articles of manufacture and particularly to such equipment as is adapted to apply heat to the product or material in the mold.

It is customary to mold the entire battery container in one operation in a hydraulic press, the material being held in the mold cavity under pressure, and heat treatment for the requisite period of time. Such containers are divided into cells adapted to hold the electrolyte and plate groups of the completed battery and the inner surfaces of the cells, and the partitions between cells are formed by what is commonly called the core member of the mold while the outer surfaces of the container are formed by plates which are movable relative to the core. The core and plates are mounted in a press, the design and operation of which may vary according to accepted practice.

Where a rubber compound or composition is used as the container material vulcanization is required to impart sufficient rigidity and strength to the finished product. For this purpose a temperature in excess of 300 degrees Fahrenheit for a period of from ten to thirty minutes is usually required while maintaining the composition under pressure in the mold. During this period of cure, it is important that the heat transmission from the mold to the material be substantially uniform and direct.

Where the core member of the mold is mounted in the press in an inverted position, as on the lower platen or ram head, heating the mold by steam is simplified since, due to the inverted position, there is no pocketing of condensate which would otherwise retard the flow of steam. However, in other presses the design is such that the core member must be mounted in its upright position on the upper platen or ram head and this presents heating difficulties because of the trapping of the condensate in each section. In this case a series flow of steam successively through the several core sections promotes successful operation because it insures a continuous flow through all core sections and the accumulation of condensate in any core section is positively prevented.

It is an object of this invention to provide a novel and improved mold core having the series type of passages for heating by steam.

A particular object of the invention is to reduce heat losses common to present day practice, to simplify the steam connections for the core member, and to guard against leakage of the steam between core sections, by providing a novel core having a more direct series passage for steam through the core sections.

A further object is to provide a novel method for forming a core from a plurality of sections whereby the sections are so confined within a core head that steam-tight joints at the abutting faces of the core sections and between the core sections and head are secured.

Other objects are to materially reduce the present high cost of core maintenance and replacement due to the use of improper materials and to eliminate losses from production rejections due to steam leaks in the core member by a novel arrangement of core sections and head, and a novel method of construction whereby the head is caused to seal the joints between core sections under unusually high pressure.

The invention will be best understood by reference to the accompanying drawing in which:

Figure 1 is a side elevation of my improved core member mounted in a hydraulic press of common type, portions of the press being shown in vertical section;

Fig. 2 is a bottom plan view of my improved mold core;

Fig. 3 is a section taken on the line 3—3 of Fig. 2, and

Fig. 4 is a section taken on the line 4—4 of Fig. 2.

Referring to the drawing, in the embodiment illustrated the core comprises sections 5, 6 and 7 each adapted to form the interior of one of the cells of a battery container, and a core head 8 in which the sections are mounted. The head 8 has an opening 9 of generally rectangular form extending substantially vertically through the head. Within this opening the core sections are securely and rigidly fastened by shrinking the core head about the several sections, as hereinafter described. Provision is made for heating the several sections by the series method whereby the steam is conducted in a continuous passage successively through the several sections.

According to the present invention the intersection steam passages and joints are located within the sections themselves. Steam under suitable pressure is admitted through the pipe 10 to one of the end sections, such as the section 5, passes successively through the other sections and out through a pipe 11. These pipes 10 and 11 are preferably arranged to extend horizontally in suitable openings in the core head 8 and are threaded directly into the core sections as indicated in Figs. 2 and 3. The passages within the core sections are formed and connected together as indicated in Figs. 2, 3 and 4. For example, a short, horizontal passage communicates with the pipe 10 at one end, with a vertical passage 12 at the other end. The lower end of the latter passage has a horizontal passage 13 connecting it with a vertical passage 14 and also with a vertical passage 15 which is closed at its upper end. The upper end of the passage 14 connects with a horizontal passage 16 communicating, end to end, with a similar passage in the core section 6. The latter has passages like those illustrated in Fig. 4 and, to conduct the steam out from section 6, I provide a horizontal passage 17 extending into the section 7. The steam passages are similarly disposed in the section 7 and communicate with an outlet passage 18 extending to the pipe 11.

An important feature of my invention comprises the means and method for preventing leakage at the junction of the passages connecting sections. This involves the seal between the abutting faces 19 and 20 of the core sections. These faces are carefully machined so as to fit together and form a tight joint under the high pressure exerted by the core head 8. Adequate pressure is created and maintained by the procedure and structure hereinafter described. The faces 19 and 20 having been parallel ground to insure a perfect fit and the several passages for steam having been drilled, the core sections are rigidly fastened together by employing a pair of bolts 21 inserted in parallel drill holes extending through the upper portions of the core sections. These bolts are drawn tight, the heads and nuts thereon being countersunk in the core sections 5 and 7. The core head 8 is carefully machined and provided with drill holes 22 to receive bolts for securing the head to the press. The opening 9 is made slightly smaller than the over-all dimension of the assembled core sections when at a temperature of approximately 70 degrees Fahrenheit. Sufficient increase in the dimensions of the core head opening 9 is obtained by expansion through heating the core head to approximately 1200 degrees Fahrenheit. This temperature is only approximate and a greater or less range of temperature may be used. When the desired temperature has been obtained, the core head is removed from the oven and the assembled core sections are immediately placed in the expanded opening 9 of the head. To facilitate proper seating, shoulders 23 (Figs. 1 and 4) are formed along opposite sides of the core sections to come to rest against the bottom face of the core head. The core head is then allowed to cool and in so doing contracts and compresses the core sections together along the faces 19 and 20 with great force. The faces at which steam-tight joints may be obtained in this manner may include the end faces of the openings 9, if it is desired to form the steam inlet and outlet passages directly in the core head instead of providing the pipes 10 and 11 threaded directly into the core sections as illustrated.

The desired contraction of the core head on the core sections may be obtained by basing the dimensions of the core head opening not only upon the contraction obtainable by expanding the core head, but also upon the expansion of the core sections obtainable after immersion in so-called dry ice or solidified carbon dioxide. The chilled sections are seated in the core head and allowed to expand while absorbing heat to a temperature of about 70 degrees Fahrenheit. This provides an additional temperature range without excessive heating of the core head.

My improved core head has sufficient thickness and width around the assembled core sections to withstand the forces set up by contraction and to properly distribute such forces when shrinkage takes place. For a three-section core of ordinary dimensions like that illustrated, experience indicates that a core head approximately three inches thick of a width (horizontally at each side of the core sections) approximately equal to three to four inches is adequate if the core head is constructed from steel having a hardness and strength of not less than the equivalent of from .40–.45% regular carbon steel. Steels of carbon content lower than the above specified limits have been found to expand in the core section when in service and this expansion subsequently results in steam leaks at the junctions of core sections. As indicated in Fig. 2, the corners of the opening 9 and corresponding corners of the core sections should be filleted to avoid the development of undue strain in the core head at these corners.

As shown in Fig. 1, my improved core head is mounted in its normal upright position on the platen 24 of a suitable press. The press illustrated is of the type in which the platen 24 is stationary and plates 25, for forming the exterior surfaces of the battery containers, are mounted on a movable ram 26 of the press. In operation plastic composition 27 for forming a container is placed in the mold and then the press is closed by raising the ram 26 and thereby forcing the core sections into the composition 27 under pressure sufficient to form the container. The composition is then cured or vulcanized by retaining the core in the mold while heating to the desired temperature by forcing steam under high pressure through the passages provided in the core sections.

After this curing or vulcanizing operation the press is opened and the container is removed. By the arrangement illustrated and described herein, I obtain the uniform, high temperature required and the losses hereinbefore described, which are ordinarily caused by leakage in the connections between sections, are eliminated.

Having described my invention what I claim as new and desire to protect by Letters Patent is:

1. A core for forming battery containers comprising, a core head formed with an opening to embrace a plurality of core sections, and a plurality of core sections each adapted to form the interior surfaces of a battery cell and each formed with a smooth face fitting against a similar face of another section, said sections being held within the embrace of said head by a shrink fit therein and severally formed with passages for steam communicating, end to end, with each other at said faces, the joints between passages at said faces being sealed.

2. A core for forming battery containers comprising, a core head having strength and hardness equivalent to a steel head of not less than .4 per cent carbon content and formed with a centrally located opening to embrace a plurality of core sections, and a plurality of core sections fitting in said opening and each adapted to form the interior surfaces of a battery cell, said sections being held within the embrace of said head, having faces abutting one against another, said sections being severally formed with passages for steam communicating, end to end, with each other at said faces, said head being contracted relative to said sections to seal the joints at said faces.

3. In the manufacture of sectional cores for forming battery containers, said cores having interconnected passages for steam formed entirely in the core sections, the method of forming steam-tight joints at the junctions between sections which consists in forming a core head with a central opening to embrace said sections with a shrink fit, heating the core head to expand it sufficiently to receive said sections in said opening, placing the assembled core sections in said core head opening and allowing the assembly to cool.

4. The method of manufacturing sectional cores for forming battery containers which consists in forming in a plurality of separate core sections a continuous passage for steam, entirely in the core sections, forming a core head with a central opening to embrace said sections with a shrink fit, heating the core head sufficiently to expand the same to receive said sections, placing the assembled core sections in the expanded opening in the core head and allowing the assembly to cool.

5. A core for forming battery containers comprising, a core head formed with a rectangular opening to embrace a plurality of core sections and a plurality of core sections each adapted to form the interior surfaces of a battery cell and thin partitions between cells, each of said sections having a plane, smooth, inner face engaging a similar face of another section, and plane, smooth, outer faces engaging the surfaces of said head in said opening, said sections being held under high pressure within the embrace of said head by tension of the latter and being severally formed with passages for steam communicating end to end with each other at said inner faces, the joints between passages at said inner faces being sealed by the pressure exerted by said head.

6. The method of manufacturing sectional cores for forming battery containers which consists in forming in a plurality of separate core sections a continuous passage for steam, forming a core head with a central opening to embrace said sections with a shrink fit, altering the normal relative temperatures of said sections and head to cause said sections to fit into the core head opening and while so altered placing the assembled core sections in the core head opening and finally allowing the temperatures of the core sections and head to equalize and thereby compress said sections together within said opening.

ALVIN O. FUHRMANN.